(12) United States Patent
Boutant et al.

(10) Patent No.: US 11,049,350 B2
(45) Date of Patent: Jun. 29, 2021

(54) METHOD FOR AUTHENTICATING AND/OR CHECKING THE INTEGRITY OF A SUBJECT

(71) Applicant: KERQUEST, Chindrieux (FR)

(72) Inventors: Yann Boutant, Chindrieux (FR); Thierry Fournel, Saint-Galmier (FR)

(73) Assignee: KERQUEST, Chindrieux (FR)

( * ) Notice: Subject to any disclaimer, the term of this patent is extended or adjusted under 35 U.S.C. 154(b) by 0 days.

(21) Appl. No.: 15/778,568

(22) PCT Filed: Nov. 28, 2016

(86) PCT No.: PCT/FR2016/053125
§ 371 (c)(1),
(2) Date: May 23, 2018

(87) PCT Pub. No.: WO2017/089736
PCT Pub. Date: Jun. 1, 2017

(65) Prior Publication Data
US 2019/0251773 A1    Aug. 15, 2019

(30) Foreign Application Priority Data

Nov. 27, 2015   (FR) ...................................... 1561527
Feb. 20, 2016   (FR) ...................................... 1670055

(51) Int. Cl.
*G07D 7/202*   (2016.01)
*G07D 7/00*   (2016.01)
(Continued)

(52) U.S. Cl.
CPC ......... *G07D 7/205* (2013.01); *G06K 9/00577* (2013.01); *G06K 9/6201* (2013.01); *G07D 7/003* (2017.05); *G06K 2009/6213* (2013.01)

(58) Field of Classification Search
CPC .... G07D 7/205; G07D 7/003; G06K 9/00577; G06K 9/6201; G06K 2009/6213
See application file for complete search history.

(56) References Cited

U.S. PATENT DOCUMENTS

| | | | |
|---|---|---|---|
| 4,423,415 A | | 12/1983 | Goldman |
| 5,982,932 A | * | 11/1999 | Prokoski ............... G06F 17/153 |
| | | | 382/224 |
| 2004/0001604 A1 | * | 1/2004 | Amidror .............. B42D 25/342 |
| | | | 382/100 |

OTHER PUBLICATIONS

Smith et al., "Glass pattern responses in macaque V2 neurons", Journal of Vision, 2007, pp. 1-15, vol. 7(3), No. 5.
(Continued)

*Primary Examiner* — Jamil Ahmed
(74) *Attorney, Agent, or Firm* — Nixon & Vanderhye

(57) ABSTRACT

Disclosed is a method for authenticating and/or checking the integrity of a subject, including:—visually superimposing, optically or electronically:—at least one so-called authentication image of at least one authentication region of an authentic subject, the authentication image including at least one texture of random composition,—and, also, the authentication region per se of a candidate subject or at least one verification image of the authentication region of the candidate subject,—in the event of observing, on the image resulting from the superimposition, a Glass pattern optical phenomenon in the authentication region, concluding that the candidate subject is the authentic subject and/or the at least partial integrity of the authentication region of the authentic subject.

20 Claims, 10 Drawing Sheets

(51) Int. Cl.
      *G06K 9/62*         (2006.01)
      *G06K 9/00*         (2006.01)

(56)           References Cited

OTHER PUBLICATIONS

Osaka et al., "Object Recognition Attention and Action", 2007, p. 163, XP055314972.
Jenkin et al., "Seeing Spatial Form", 2006, p. 51, XP055314968.
International Search Report, dated Feb. 22, 2017, from corresponding PCT application No. PCT/FR2016/053125.

* cited by examiner

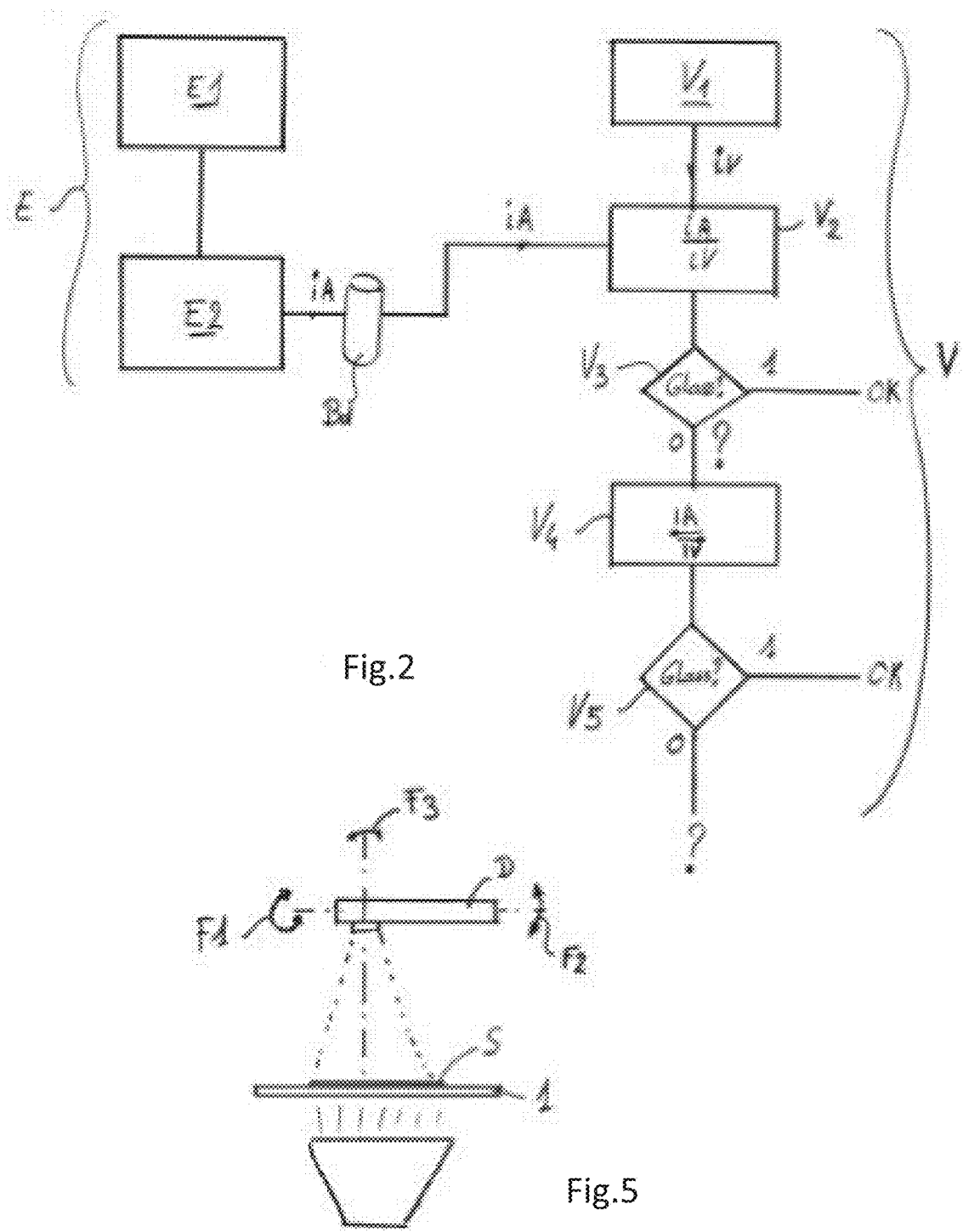

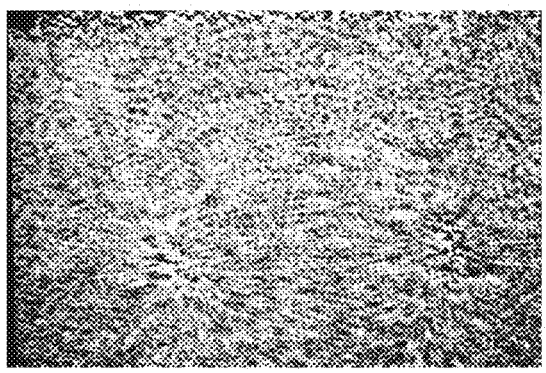
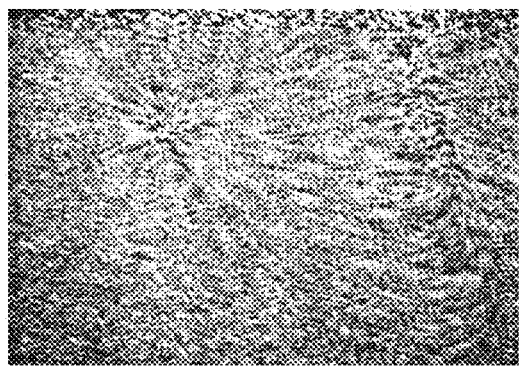
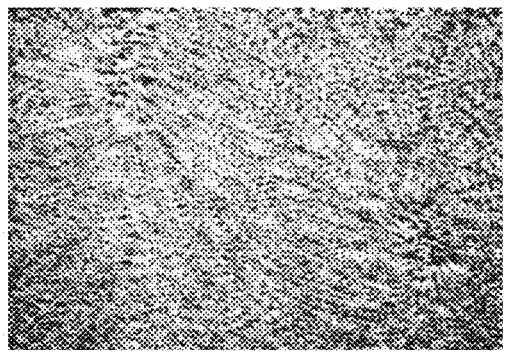
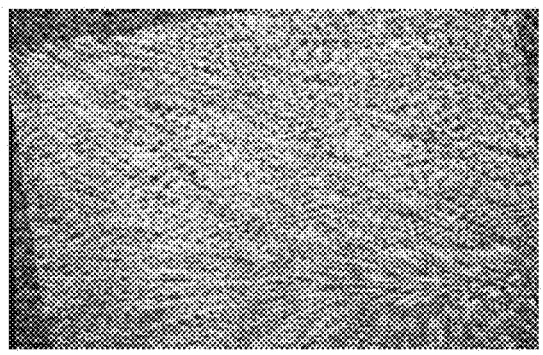
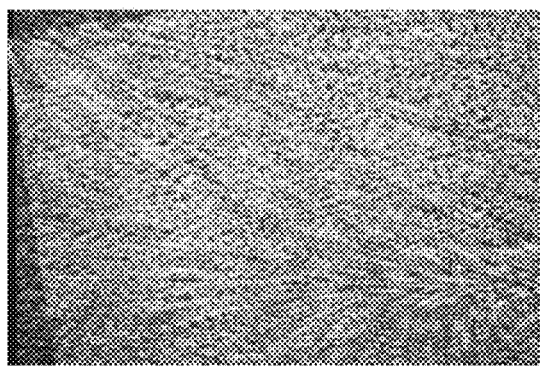
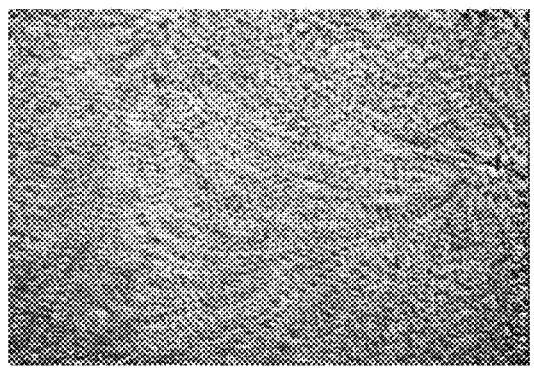
FIG. 7

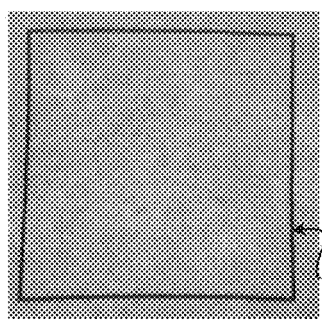
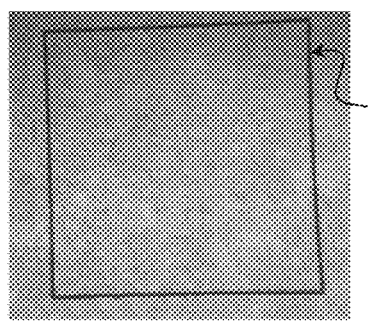
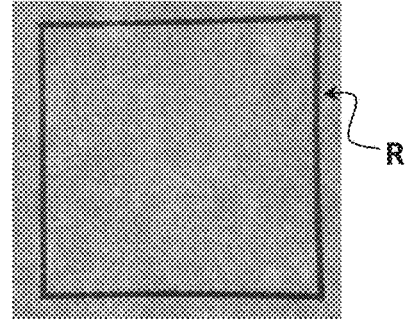
FIG. 8          Fig. 9          Fig. 11
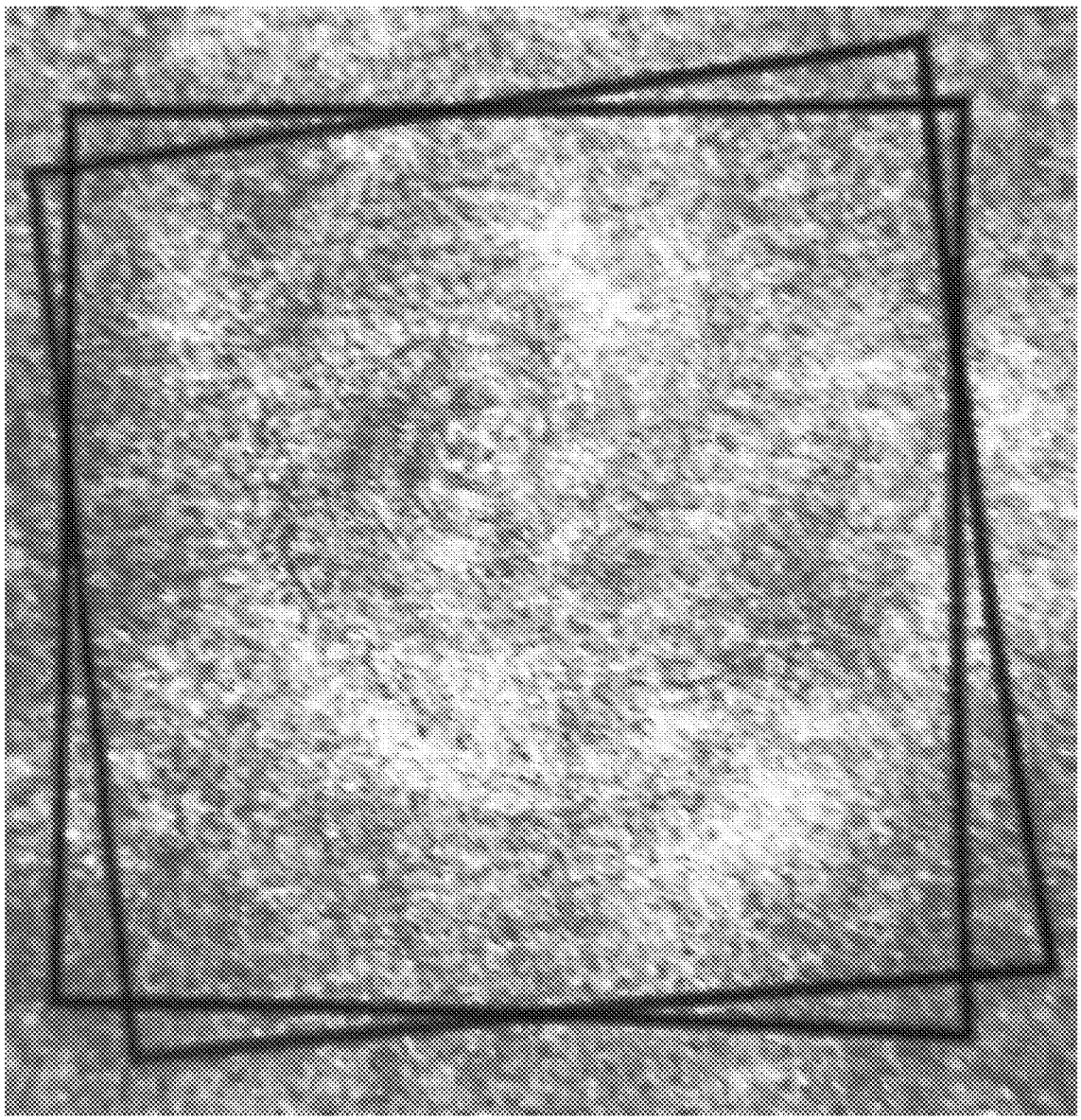
FIG. 10

METHOD FOR AUTHENTICATING AND/OR CHECKING THE INTEGRITY OF A SUBJECT

BACKGROUND OF THE INVENTION

Field of the Invention

The present invention relates to the technical field of authentication and checking of integrity of material subjects as well as the field of the visual cryptography. In a preferred but non-exclusive application, the invention relates to the field of unitary authentication of material subjects.

Description of the Related Art

In the above-mentioned field, it is known, in particular from a U.S. Pat. No. 4,423,415, to make the identification of material subjects by extracting a signature from a so-called authentication area comprising an essentially random three-dimensional intrinsic micro-structure. This extraction is generally made with electronic computing means such as a computer and require, for verifying the authenticity of a subject, to implement again such computing means. Hence, according to certain known methods, a first extraction of the signature from the authentication area is performed in order to record an authentication signature. Then, during the authenticity verification, a second signature, called verification signature, is extracted from the same authentication area, and a comparison of the authentication and verification signatures is carried out to determine the authenticity based on a threshold of similarity of the signatures. According to other known methods, a similarity or correlation coefficient between a previously recorded authentication image and a verification image acquired at the moment of the authenticity verification is computed so as to conclude or not, based on the correlation or similarity coefficient, in the authenticity of the subject.

Such methods, if they effectively allow authentications having a very low risk to conclude in the authenticity of a non-authentic subject, have nevertheless for drawback to require computing operations and the corresponding resources, both during the recording phase and during the verification phase. Moreover, the operator or the human is excluded from the process of authenticity validation so that the operator must blindly trust in the computing system as regards the process of authenticity validation. Besides, there still exists a risk that the computing system can be pirated or fraudulently modified so as to provide a result concluding in the authenticity whereas it is not the case.

Methods are also known, which have proposed, in a recording phase, to record an authentication image with a high magnification or enlargement rate of an authentication area of the material subject to be authenticated, so as to allow the observation of microscopic details of this authentication area. Those methods then propose, in a verification phase, to make an operator observe at the same magnification or enlargement rate a verification image of the authentication area on the subject to be authenticated, so that the operator can perform a visual comparison of the two juxtaposed images to identify the identical areas or the different areas and to conclude or not in the authenticity of the subject to be authenticated. If such a method or process allows an authentication that requires no computing means because the authentication results from a visual comparison performed by an operator, this visual method has for major drawback to require a long preliminary training of the operator and/or a relatively long duration of observation for the operator to be able to conclude in the authenticity or not with satisfying degree of self-confidence and certainty. Moreover, these methods implement the explicit memory of the operator, a memory that is very variable from one individual to another one.

Hence, the need has arisen for a new method of visual authentication which, while requiring no or not much computing means for the final phase of decision about the authenticity, by taking advantage of the performances of the human visual system of an operator, allows this operator to conclude in the authenticity with a reduced time of observation with respect to the known methods and offers the operator means for being confident in his/her judgement. Within the meaning of the invention, the term "visual" relates to both natural or artificial vision.

BRIEF SUMMARY OF THE INVENTION

In order to achieve this objective, the invention relates a method for visual authentication and/or visual checking of integrity of a subject consisting in:
  visually superimposing, optically or electronically:
    on the one hand, at least one image, called authentication image, of at least one authentication area of an authentic subject, the authentication image comprising at least one continuous random component texture, and
    on the other hand, the authentication area itself of a candidate subject or at least a verification image of the authentication area of the candidate subject,
  in case of observation, on the image resulting from the superimposition, of an optical phenomenon of the Glass pattern type at the authentication area, concluding that the candidate subject is the authentic subject and/or in the at least partial integrity of the authentication area of the authentic subject.

As regards, the authentication area, according to the invention, the image or visual representation thereof by the human visual system (in abbreviated form: HVS) has a texture that an observer with a mean visual acuity can observe either with the naked eye or via an optical and/or digital zoom. Hence, the observation of structures of small size or perceived as being of small size by the HVS at the observation enlargement rate are perceived by the HVS as images containing a texture. This is the case, for example, of grains of sand: observed with the naked eye at a distance of several tens of centimetres, they are perceived as being of small size, whereas, when observed through a magnifying glass, they are perceived as objects of mean size. Likewise, a meadow observed from several tens of metres is perceived as being uniform or consisted of a structure with very small and indiscernible elements, whereas, when observed from a few tens of centimetres, is it possible for an observer to perceive the blades of grass. The same phenomenon is perceptible as regards a pebbly beach, according the distance of observation.

Within the framework of the invention, the term "texture" relates to what is perceptible by the HVS as a signal or an homogeneous area in an image coming from direct observation or via an optical system or via an image acquisition system at least provided with display means, whereas the term "structure" relates to the composition and organization of the constitutive matter of the subject itself. The texture of interest of the authentication area is qualified as a random component texture in that it comprises at least a part or a certain proportion of hazard or irregularity. By way of illustration, the image of a subject weaved using yarns made of fibres generally includes an quasi-periodical or regular component corresponding to the weave of the fabric and a random component corresponding to the fibres and reflecting the variability thereof. The combination of the two components corresponds to what is observed as a texture qualified, within the framework of the invention, as a random component texture. In the observation of a superimposition of an authentication image with a verification image of a same authentication area of a fibre yarn fabric, it is observed, according to the method of the invention, a pattern of the Glass type resulting from the random component of the texture combined to a regular moiré resulting from the regular component of the texture.

Within the framework of the invention, the term "texture" relates to what is visible or observable on an image or a subject or a scene, whereas the term "structure" or "microstructure" relates to the material subject itself. Hence, a texture or microstructure of the authentication area corresponds to an image of the structure or microstructure of the authentication area.

Within the framework of the invention and according to certain configurations, a random component texture may be qualified as continuous (continuous random component texture) in that it results from the observation or is the image of a continuous structure, of the juxtaposition or the optical overlapping of continuous structures, of the juxtaposition or the optical overlapping of particles or elements perceived as being of small size at the observation magnification or scale. Within the framework of the invention, a continuous, or visually continuous, microstructure or structure is either materially or physically continuous, or consisted of elements juxtaposed in such a manner that, visually, two adjacent or consecutive elements are visually in contact or superimposed to each other, by opposition to a discrete structure in which two adjacent or consecutive elements are not visually in contact. It is also possible to define the continuous structures or microstructures within the meaning of the invention as being in particular media without voids or the particulate media for which the Knudsen number is small compared to 1, or dense media at the observation scale.

In a preferred embodiment of the invention, each authentic subject belongs to the subject families comprising at least one authentication area whose material structure is not easily reproducible, i.e. whose reproduction is difficult or even impossible in that it results in particular from a formation process that is not fully controlled, implying hazard at the level of the components and/or from the process itself. The imaging, in similar conditions of observation, from neighbour points of view of such an authentication area, provides images each including a random component texture, which is the noisy reflection of its material structure. Such a random component texture inherits its unpredictability and independence with respect to a random component texture comping from a fully different authentication area, from the hazard part in the formation of their material structures. The authentication areas correspond to the "Physical Unclonable Functions" (PUFs) as defined in particular by the English publication Encyclopedia of Cryptography and Security, 01/2011 edition, pages 929 to 934, in the article of Jorge Guajardo. Preferably, the authentication area of a subject according to the invention corresponds to an intrinsic physical unclonable function, called "Intrinsic PUF" in the above-mentioned article.

The inventors take advantage of the fact that the random nature of the three-dimensional structure of the authentication area is inherent or intrinsic to the nature itself of the subject or of the authentication area, because resulting from its mode of elaboration, development or growing, so that it is not necessary to add to the authentication area a particular structure, in particular a print, or an engraving, whose unique function would be to generate Glass patterns by superimposition of images of this particular structure. According to the invention, it not either necessary to synthesize, extract or generate from the authentication area one or several discrete patterns intended to produce a Glass pattern. However, this does not exclude the use of natural or added singularities to facilitate the registration and/or the relative scaling, for example.

Among the material subjects comprising an authentication area adapted to the implementation of the method of visual authentication according to the invention, it may be mentioned in particular:
  the papers and cardboard packages,
  the fibrous materials,
  the metallic, plastic, ceramic or other sintered materials,
  the alveolar or cellular materials,
  the leathers, including stingray leathers,
  the wood,
  the metals, in particular worked, coined, moulded, injected or rolled,
  the glass, the ground glass,
  the plastic materials, the rubber,
  the woven or nonwoven textiles (possibly with descreening),
  certain furs or plumages,
  images of natural scenes, such as:
    landscape images,
    foliage images,
    cloudy sky images,
    road or pavement coating images,
    field or meadow images,
    stone or concrete wall images,
  the skin or the fingerprints,
  the iris of an animal or human eye, the biometric prints,
  the works of art,
  the powder or granulate products or materials stored in a transparent container or package,
  without this list is limitative, nor exhaustive.

It is to be noted that the multi-scale character of the subject in an authentication area can allow the observation of natural textures with several distinct magnifications rates, Glass patterns being then liable to be observed or generated at each of said magnification rates. Moreover, different parts of a same authentication area may have different optical behaviours and, for example, comprise a part that transmits light and part that reflects light in a specular or scattering manner.

As regards the so-called Glass patterns, the present invention takes advantage of the highlighting by the inventors that patterns similar to those obtained by Léon GLASS in articles of the journal NATURE, vol. 223 of 9 Aug. 1969, pages 578 to 580, and vol. 246 of 7 Dec. 1973, pages 360 to 362, may appear by superimposition of two images respectively comprising natural or random component textures resulting from the acquisition or even the photography with a suitable magnification or enlargement rate of a same multi-scale random intrinsic three-dimensional material structure of a same subject. In this respect, it is also possible to refer to the publication of Léon GLASS entitled "Looking at dots", published in 2002 in Mathematics Intelligencer, 24, Nr. 4, pages 37 to 43, as well as to the publication of Matthew SMITH et al., entitled "Glass pattern response in macaque V2 neurons" of the Journal of Vision of 27 Feb. 2007, 7.3.5, pages 1 to 15. The inventors have demonstrated that these patterns, of the Glass type, appear only when there is a superimposition of continuous random component textures coming from the same material structure and essentially residual geometric transforms from each other and do not appear in practice when the continuous random component textures are not correlated enough or do not result from the acquisition of the same material structure corresponding to an authentication area of a subject. The invention is hence able to allow a unitary authentication.

The method according to the invention is based on the observation of Glass patterns, observation that implements, according to Léon GLASS, the visual system that is widely shared by all human beings. It is an instinctive process similar to the differentiation between two colours, that involves no thinking or intellectual mechanism thought out as such.

The observation of a pattern of the Glass type further immediately allows, within the framework of the invention, the operator to secure or reinforce his/her decision to validate or not the authenticity of the candidate subject. In this respect, it is to be emphasized that the invention makes it possible to clear up the doubt as regards the authenticity of the candidate subject insofar as, if a pattern of the Glass type is observed whereas the authenticity is certain in the given conditions of implementation (if the conditions of implementation are well respected) of the subject that remains under the sight and/or accessible for handling by the operator, without image processing denaturing the continuous random component texture coming from the material structure of the authentication area. On the other hand, in case of non-observation of a Glass pattern, it is not possible to conclude with certainty in the non-authenticity.

Moreover, the inventors have highlighted that, in case of authentication of a material subject, if said material subject has a sufficient material stability over time, images taken at different time instants, which may be separated by several days, months or years, make it possible, by superimposition thereof, to generate such Glass patterns. Moreover, according to the invention, the authentic subject may undergo modifications after the recording of the authentication image while remaining authenticatable insofar as a part of the authentication area has not been deeply affected by these modifications, voluntary or not.

The inventors have also highlighted that it is not necessary to make the synthesis and/or construction and/or fabrication of a specific structure, (quasi-) random or not, to generate a Glass pattern, and in particular it is not necessary to print or generate a cloud of dots with a random or quasi-random distribution on a medium to obtain the apparition of a Glass pattern by the superimposition of images of this cloud. The inventors have also highlighted that Glass patterns obtained after superimposition of images are liable to authenticate a subject based on its non-reproducible character and on an acquisition, in similar conditions of observation, of its random component texture at two different time instants and not only to appear in response to a synthesis of dot images, typically for a purpose of authentication or study of the ability of the human vision to identify such a pattern. Moreover, the inventors have demonstrated that the observation of Glass pattern is possible by superimposition of two images of a same authentication area having a continuous random component texture and that, without adding, extracting or generating discrete elements or discrete patterns, as recommended by the prior art.

The invention has for advantage to implement simple processes that require no significant computing power and/or no fine polling/comparison, as it is the case for the prior systems, insofar as the invention is based, on the one hand, on the properties of unicity, non-reproducibility and unpredictability of the material structure, and on the other hand, the human visual system, i.e. the ability of the later to naturally perform an identification of the presence of a Glass pattern, as shown by Léon Glass himself. Moreover, the observation of the Glass pattern, measurable physical reality, may also be performed by an industrial or synthetic vision electronic device performing measurements of similarity between the two images or field measurements on the image composed of the superimposition of the two images.

According to a first embodiment, the method for authentication of a subject by means of patterns of the Glass type comprises the following steps: selecting an authentic subject among three-dimensional or material subjects each having at least one so-called authentication area having, in given conditions of observation, an intrinsic material micro-structure that is not easily reproducible and observable, as the case may be via an ad hoc device, by an observer having a mean visual acuity, in a recording phase:
acquiring at least one so-called authentication optical image of the authentic subject comprising at least the authentication area, the acquisition being performed at a given acquisition magnification or enlargement rate and/or in given conditions so that, for an observer having a mean visual acuity, the image of the authentication area has at least one continuous random component texture,
recording the authentication image,
in a verification phase:
at least partially superimposing each authentication image and a candidate subject, for:
in case of observation of the apparition of an optical phenomenon of the Glass pattern type, concluding that the candidate substrate is the authentic subject, and
in case of non-observation of a Glass pattern, making an at least local geometric transformation of the authentication image and/or a relative displacement of the authentication image with respect to the candidate subject for, in case of observation of the apparition of an optical phenomenon of the Glass pattern type, concluding that the candidate subject is the authentic subject.

According to a characteristic of the first embodiment, the authentication image is projected to the to-be-authenticated or candidate subject.

According to another characteristic of the first embodiment, the acquisition of the authentication image is performed at an acquisition magnification or enlargement rate allowing the superimposition of the authentication image and the candidate subject.

According to still another characteristic of the first embodiment, the authentication area of the authentic subject is at least translucent and the verification is performed in show-through mode.

According to a characteristic of the first embodiment, the verification phase is performed by means of an electronic device comprising at least display means adapted to display or project the authentication image and to allow the superimposition of the candidate subject and the authentication image substantially at the scale of the candidate subject.

According to the first embodiment of the authentication method according to the invention, the authentication image is suitably directly superimposed to the candidate subject.

However, such an operating mode is not strictly necessary for the implementation of the invention.

According to a second embodiment, a method for visual authentication of a subject by means of Glass patterns comprising the following steps:
selecting an authentic subject among three-dimensional or material subjects each having at least one so-called authentication area having, in given conditions of observation, an intrinsic material micro-structure that is not easily reproducible and observable by an observer having a mean visual acuity,
in a recording phase:
acquiring at least one so-called authentication image of the authentic subject comprising at least the authentication area, the acquisition being adapted to allow perceiving a random component texture at the level of the image of the authentication area,
recording the authentication image,
in a verification phase:
acquiring at least one verification image of a candidate subject comprising at least one part of the authentication area, the acquisition being performed at a magnification or enlargement rate allowing a visualization of the authentication and verification images at close or similar scales,
at least partially superimposing the authentication and verification images, for:
in case of observation of the apparition of an optical phenomenon of the Glass pattern type, concluding that the candidate substrate is the authentic subject, and
in case of non-observation of a Glass pattern, making an at least local geometric transformation of at least one image of the superimposed images and/or a relative displacement of the superimposed images for, in case of observation of the apparition of an optical phenomenon of the Glass pattern type, concluding that the candidate subject is the authentic subject.

In a preferred embodiment, if no Glass pattern is observed at the simple superimposition, then the verification phase is continued to search for a Glass pattern by firstly making a relative registration of the verification and authentication images, then by making transformations of the relative scale modification or homothetic transformation type and/or displacements of the rotation and/or translation type or combinations of these displacements.

In another preferred embodiment, the authentication and verification images are made in similar conditions.

In a preferred but not strictly necessary manner, during the visual verification phase, the candidate subject is physically present in front of the operator that may observe it directly or indeed touch it, and even move it or move around it the optical or acquisition system associated with a display system. Hence, the candidate subject is located in the sensorial environment of confidence of the operator, which contributes to the reliability of the authentication operation.

Likewise and in a preferred but not strictly necessary manner, the image quality corrections made on the verification image and/or on the authentication image are performed in real time under the visual control of the operator, so that he/she can make sure that there is no denaturation of the random component texture in the image and/or image substitution, these modifications being preferably reversible so that it is possible to come back to the initial image.

Within the framework of the invention, the superimposition performed may be static, i.e. without relative movement of the superimposed elements, or dynamic, i.e. during a relative movement of the superimposed elements, as possible decidable by the operator. Likewise, according to the invention, it is possible to superimpose two images or an image and a video stream, or even two video streams, it being understood that a video stream corresponds to a sequence of images. Hence, within the framework of the invention, what is explained in relation with a superimposition of static images applies mutatis mutandis to a superimposition of one image with a sequence of images or a superimposition of sequences of images, in a synchronised manner or not.

It is to be noticed that the two embodiments of the invention search for the apparition of a pattern of the Glass type. Now, such a Glass pattern appears only in the case of an authentic subject and if a non-zero slight geometric transformation, called, within the meaning of the invention, residual geometric transformation, exists between the candidate subject and the authentication image or between the verification and authentication images, acquired in the given conditions. In the theoretical case of a perfect superimposition of strictly identical elements/images, there is no apparition of a Glass pattern, even in the presence of an authentic subject, hence the necessity of presence of this residual geometric transformation and the general interest of implementing a movement or a relative displacement or a deformation induced by a difference of shooting angle or of point of view between the acquisitions of the authentication image and of the verification image. This property of the Glass patterns offers a great robustness according to the invention insofar as it is not necessary that the conditions of acquisition of the verification image are strictly identical to the condition of acquisition of the authentication image. Hence, the resolutions of the authentication and verification images may in particular be different.

It is to be noted that, according to the invention and within the framework of the first embodiment, the authentication image is an optical image whose acquisition chain comprises an optical part and which results from the solicitation of the authentication area by a light radiation visible or perceptible by the human eye, the human visual system or a suitable sensor of an industrial or automated vision system.

Within the framework of the second embodiment, the term "image" is to be understood in the board sense and not limited to the only sense of an optical image resulting in particular from the solicitation of the authentication area by a visible light radiation. Hence, within the framework of the second embodiment, the authentication and verification images may be obtained by any type of solicitation of the authentication area in association with a suitable acquisition chain, it being understood that the same type or the same nature of solicitation is implemented for the acquisition of the authentication and verification images. Among the conceivable types of solicitations or modes of acquisition, it may be mentioned in particular: ultrasounds, X or gamma radiations, x-ray or laser tomography, X-ray radiography, magnetic resonance, without this list is limitative nor exhaustive.

According to a preferred but non strictly necessary characteristic of the second embodiment of the invention, the verification phase is performed by means of an electronic device comprising at least:
acquisition means adapted to acquire at least one verification image,
display means adapted to display the verification image on a visualization screen and to allow the superimposition of the verification and authentication images substantially at a same scale.

In a preferred but not strictly necessary manner, the electronic device is adapted to allow modulating or adjusting the level of absolute or relative transparency or opacity of the superimposed images. This level of transparency or opacity is also called channel α. Hence, the electronic device is preferably adapted to allow an adjustment of the channel α.

According to a variant of the invention, the electronic device is adapted to provide a display of a sequence or a series of verification images resulting from a relative displacement of the acquisition means and of the candidate subject and to allow the superimposition of the verification images with the authentication image. This variant makes it possible, in particular, to easily implement the method according to the invention when the exact place of the authentication area on the candidate subject is not perfectly known or marked on the latter.

According to another variant of the invention, during the recording step, a sequence of authentication images is acquired and the electronic device, used during the verification phase, is adapted to acquire a sequence of verification images and to allow a visualization of the superimposition of the sequence of authentication images with the sequence of verification images.

According to another variant of the invention, the electronic device comprises processing means adapted to perform an at least local geometric transformation of at least one image of the superimposed images and/or a relative displacement of the superimposed images. This variant may in particular facilitate the task of the operator, who can then trigger the acquisition of only one verification image, the electronic device then making it possible to perform the relative displacement or the relative geometric transformation required for the apparition of a pattern of the Glass type in the case of an authentic subject.

According to still another variant of the invention, at least one verification image is digitally recorded. Such a digital recording substantially facilitates the subsequent processing operations made by the electronic device.

It is to be noted that, within the meaning of the invention, the term "recording" without clarification is understood in the broad sense, under the condition of course of being compatible with the corresponding implementation of the invention. Hence, the term "recording" relates, within the meaning of the invention, to a recording by any suitable way in a digital or analog form. Among the embodiments compatible with the invention, it may be mentioned in particular: a recording in any computer and/or electronic format, a recording in a printed form on a medium adapted for the implementation of the invention, as for example a transparent medium, a photographic recording on a medium such as a positive or negative, colour or black and white photographic film, a recording in a holographic form, a recording in an engraved form, in particular by a laser, without this list is not limitative nor exhaustive.

According to another variant of the invention, the verification image is visualized and/or recorded in a binary form, in grey level or in halftone or in colour. Likewise, according to still another characteristic of the invention, the authentication image is visualized and/or recorded in a binary form, in grey level or in halftone or in colour.

According to a characteristic of the invention, the electronic device is adapted to record at least one image resulting from the superimposition.

According to another characteristic of the invention, the authentication method further comprises an automatic verification phase that is performed at least in part by the electronic device. The part of the automatic verification phase performed by the electronic device may then simply comprise the acquisition of the verification image and the sending of this verification image to an external processing unit. Of course, the electronic device may also perform all the steps of the automatic verification phase.

According to a characteristic of the invention, the automatic verification phase comprises a step of computing a similarity coefficient between a verification image and the authentication image for, is the similarity coefficient is higher than a given threshold, concluding in a high probability of authenticity or even in an authenticity and, in the opposite case, not concluding in the authenticity (no doubt clear up).

According to a variant of this characteristics, the computing of the similarity coefficient is, for example, performed based on signatures extracted from a verification image and from the authentication image. It is also possible to use a vector "coming from the decomposition" of the image to be analysed on a predefined basis, typically Gabor functions or wavelets matching with the characterization of the receptive fields of the primary visual cortex (cf. J. G. Daugman, Computational Neuroscience, ed. Schwartz E., 403-423, MIT Press, Cambridge, Mass., 1990), or a base learned on a family—typically to which the subject image belongs—matching with the characteristics of this family, by non-negative matrix factorization (NMF) or main component analysis (MCA). The atypical use (i.e. a predefined base other than Gabor, and a family other than that to which the subject image belongs) is possible.

The signature may be directly the decomposition vector and the similarity measurement, the Euclidian distance, for example in the case of the NMF. The signature may be the vector formed of the signs of the components of the decomposition vector and the similarity measurement, the Hamming distance: case of the Daugman "iriscode" that may easily be transposed to other types of subjects to be authenticated.

The automatic verification phase may comprise a step of transmission or communication of the result of the automatic verification to a third party or to the operator. By "third party", it is to be understood any person different from the operator, as for example a manufacturer, a vendor or an owner of the candidate subject, an authority of certification or authentication, an authority or a governmental or supranational agency, the public authorities, a service provider, a trusted third party, without this list is limitative nor exhaustive. The result of the automatic verification may also be associated, before the sending, to other data such as operator geolocation, timestamp, profile or identity data, without this list is exhaustive. Such data may be used within the framework of the Customer Relationship Management (CRM), or even "Enhanced Customer Experience" applications. Such data may also be used by the producer or a distributor of an authenticated subject, in order, in particular, to know if this subject is in a catchment area for which it has been provided, in particular in order to control the distribution networks and to prevent the parallel distribution.

It is to be noticed that the visual authentication phase performed by the operator may also, and independently of any automatic verification, be followed by a phase of information sending to a third party initiated by the operator. The information sent can in particular indicate whether the doubt had been cleared up.

According to a characteristic liable to be used in the two embodiments of the invention, the authentication image is recorded by applying to the latter a matrix or a grid of cells with thick edges independent of the authentication image, whose inside is formed by the corresponding part of the authentication image after it has been subjected, as the case may be, to an at least geometric transformation chosen among a collection of transformations. Such a recording mode of the authentication image may, in certain applications, facilitate the checking or the verification performed by the operator. It is to be noticed that all the cells of a grid do not necessarily have a same shape. Moreover, the size or the surface of each cell is chosen so as to be sufficient to allow the total or partial visualization of a Glass pattern, as the case may be, in the corresponding cell. The thickness of the cell edges must be at least equal to the length of correlation of the authentication image at the position of the cells in question, so as to play the role of separating surface between the cells and not to allow the prediction of the reverse transformation to that applied, as the case may be, to a given cell (independence between the insides of two disjoint cells). By "correlation length", it is to be understood a value proportional to the half-height width of the auto-correlation peak of the image considered.

According to a variant of this characteristic, the cells undergoing a transformation are chosen so as to form a message or pattern upon superimposition with a verification image. This variant of implementation of the invention may be considered as a method of visual cryptography with two shared images, one of the images being the authentication image, whereas the other image is either the candidate subject itself or a verification image.

It is to be noted that, according to a variant of the invention, the grid of cells and the choice of a transformation to be made or not per cell may be applied in this latter case only or also to the verification image. Beside the revelation of a secrete message-image, the visualization of a message-image in case of authentic subject makes it possible to facilitate and reinforce the decision taking and the confidence of the operator.

According to a characteristic applicable to the two embodiments of the invention, the geometric transformation consists in at least one residual geometric transformation to be applied locally to the image(s), chosen of the rigid type or not, of linear or non-linear nature, with at least one fixed or quasi-fixed point. Among the geometric transformations applicable, it is hence possible to implement the transformations described by Léon Glass in its articles of 1973 and 2002 mentioned hereinabove and incorporated herein by way of reference. By quasi-fixed point, it is to be understood a point undergoing after residual geometric transformation a displacement of low amplitude with respect to the maximal displacement caused by the residual geometric transformation.

According to another characteristic applicable to the two embodiments of the invention, the geometric transformation induces a reduced modification of low amplitude of the modified part of the image of the authentication area before modification.

According to still another characteristic applicable to the two embodiments of the invention, the relative displacement is a translation, a rotation or the combination of one or several rotations and/or translations.

According to a characteristic applicable to the two embodiments of the invention, the distance of relative displacement is reduced to a low amplitude.

According to a characteristic of the invention, the authentication image is recorded in an analog form on an analog medium of the photographic film type or printed on a transparent medium.

According to another characteristic of the invention, the authentication image is recorded in grey level or half-tones. Of course, the authentication image may also be recorded in colour.

According to still another characteristic of the invention, the authentication image is recorded in a digital form and may have undergone a compression phase so as to optimize the space of storage of the authentication images, for example.

According to a variant of this characteristic, the authentication subject is associated with an identifier and the corresponding authentication image is stored in a database by being indexed at least by the identifier of the authentic subject, or the authentication image may carry the identifier as an incrustation (watermark tattoo, . . . ). The identifier may then be recorded or stored or carried by the authentic subject according to different known methods and ideally partly hidden to a mean user.

According to another variant of this characteristic, an identifier of the candidate subject is a signature extracted or computed from the authentication area. Hence, the verification phase may comprise, previously to the superimposition step, a step of determining the signature of the candidate subject followed by sending the determined signature to a server that, in response to this sending and based on the signature, addresses to the electronic verification device one or several authentication images to be used for the superimposition step. The server will then comprise a base of authentication images indexed on the basis of a signature and possibly an identifier of the authentic subjects. The verification may then consist in comparing quantitatively the signature extracted from the candidate subject either with the signature pointed in reference in the database (one-to-one authentication), or to a subset of n signatures identified in the database (n being small, typically of the order of 1 to 10) as the closest signatures and/or the most likely authentic subjects (1-to-n authentication), the corresponding authentication images being then liable to be subjected to the visual recognition or transmitted as such for execution of the method object of the invention.

According to a characteristic of the invention, the authentication and/or verification images are subjected to at least a descreening and/or filtering before superimposition. This characteristic makes it possible to eliminate potential periodic patterns liable to interfere with or to obstruct the perception of the patterns of the Glass type in case of authentic subject.

According to a preferred characteristic of the invention, the authentication and verification images undergo, in view of the superimposition, for the verification phase, no transformation other than operations of improvement or modification of the contrast, of the brightness, of half-tone transformation, of colorimetric space change, such as the passage to grey level or black and white, operations of modification of the saturation in certain shades, level inversion or modifications of relative opacity via the channel $\alpha$. Hence, according to this preferred characteristic, the images generally undergo so-called improvement transformations that do not affect the possibility to visually recognize the nature of the subject. Preferably, the transformations applied do not denature the images, in particular the continuous random component textures they contain. This also applies to the parts of the images located in the cells of the cryptographic variant of the invention. It is to be noted that the improvement operations may relate only one of the two images and that, moreover, these improvement operations are not always necessary for the implementation of the invention. According to a characteristic of the invention, at least one of the two images undergoes no transformation consisting in sampling it by means of any grids, thick or not, regular, periodic or random.

According to another characteristic of the invention, the position of the authentication area on the authentic subject is recorded. Such a recording makes it possible, although not absolutely necessary, to facilitate the verification phase.

According to still another characteristic of the invention, the position of the authentication area is marked on the authentic subject. This marking also makes it possible, although not absolutely necessary, to facilitate the verification phase.

According to a characteristic of the invention, the authentic subject belongs to at least one of the following document, subject or object categories: fiduciary document, security document, banknote, contract document, coin, official document, identity document or paper, luxury good, work of art, product of art, regulated product, packaging, medication in particular tablet, mechanical safety part or other, mechanical wearing part, optically variable components, protection holograms, and generally any object, product or subject, of which it may prove to be necessary to be able to check the authenticity and/or integrity.

The invention also relates to an electronic device liable to be used for either one of the implementations of the authentication method according to the invention, in particular for the verification phase. This device allows making on its display screen the superimposition of the current verification and authentication images via the channel alpha, by offering the possibility to perform in relative, as the case may be digitally, a rotation, a change of scale according to the horizontal, respectively the vertical, a translation or a correction of the distortions, in particular optical. In a preferred but not strictly necessary manner, the electronic device comprises a visualization touch-screen and is adapted to allow a modification of the visualization magnification rate of the authentication image and/or the verification image by displacement of two contact points on the touch screen. A magnification rate of ×4 may typically be investigated. The touch screen may also be advantageously used to control the relative displacement of the superimposed images, typically a rotation with a non-zero angle lower than 10°. This device allows performing efficiently a search for a pattern of the Glass type. In particular, the device allows performing, according to a preferred search, firstly the registration of the verification and authentication images, then a residual geometric transformation in order to make appear a pattern of the Glass type. An alternative consists in making a superimposition as such of the verification and authentication images up to obtain a pattern of the Glass type or the registration of the images.

Of course, the different characteristics, variants and embodiments of the method of the invention may be associated with each other according to various combinations in so far as they are not incompatible or exclusive relative to each other.

BRIEF DESCRIPTION OF THE DRAWINGS

Moreover, various other characteristics of the invention will emerge from the following description given with reference to the drawings that illustrate non-limitative embodiments of the method according to the invention.

FIG. 2 illustrates a block-diagram of an exemplary embodiment of the method according to the invention.

FIG. 5 shows an example of acquisition step of the verification phase of the method according to the invention.

FIG. 7 shows in a non-exhaustive manner various possible forms of Glass patterns liable to be visualized within the framework of the invention.

FIG. 8 is an image of an authentic subject, to be authenticated by means of the method according to the invention, formed by a sheet of paper on which the authentication area is identified by a printed frame.

FIG. 9 is an authentication image, herein a slide, of the authentication area of the authentic subject of FIG. 8.

FIG. 10 is an image of the superimposition of the images of FIGS. 8 and 9 that allows visualizing a Glass pattern.

FIG. 11 is an image of a candidate subject formed by a sheet of paper that is different from that of FIG. 8 and on which the authentication area is identified by a printed frame.

DETAILED DESCRIPTION OF THE PREFERRED EMBODIMENTS

It is to be noted that, in these figures, the structural and/or functional elements common to the different variants may have the same references.

Figure 1:
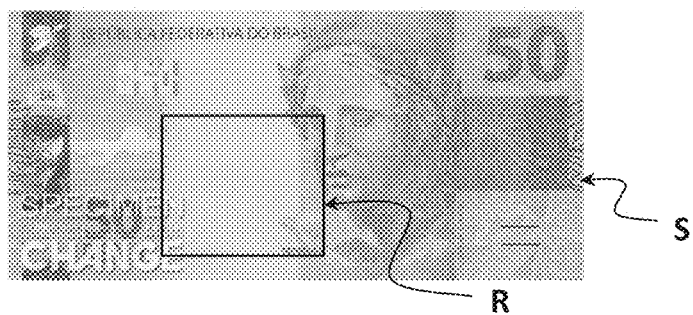
FIG. 1 is an authentic subject, to be authenticated by means of the method according to the invention, formed by a banknote on which the authentication area is surrounded.

Within the framework of a first exemplary embodiment of the method according to the invention, it is chosen as subjects to be authenticated S banknotes printed on watermark paper, as illustrated in FIG. 1. For that purpose, it is chosen as an authentication area R a watermark area at least partially translucent. Such a watermark area R has the advantage to contain the watermark pattern that offers means for easily identifying the authentication area at the level of which the Glass pattern should appear during a verification phase. Moreover, the watermark area makes it possible to easily observe the fibrous structure of the paper that constitute an intrinsic structure comparable, at the observation scale, to an essentially random continuous medium not easily reproducible, or even non-reproducible. In the case of paper, it is possible to talk about a non-reproducible essentially random continuous microstructure in that this microstructure scatters the light that illuminates it in all the directions and is by essence random and different from one area to another one on a same sheet of paper or on sheets of paper coming from the same machine or also on sheets of paper coming from different machines.

As can be seen in FIG. 2, it is firstly carried out a recording phase E that is, for example, performed after the fabrication of the banknotes and before their putting into circulation. The recording phase may for example intervene just after the printing of the serial number of each banknote.

During this recording, it is carried out for each banknote, forming an authentic subject, to the acquisition E1 of a so-called authentication image iA, shown in FIG. 2, comprising at least the authentication area. To perform the acquisition, a system is implemented, which makes it possible to place each banknote in front of an acquisition video camera connected to an electronic data recording and storage system. The lighting of the banknotes is preferably performed on the opposite side of the acquisition camera so that the acquisition area is observed in transmission mode. Generally, the lighting of the subject, herein the banknote, is adapted to the optical behaviour in reflection and/or transmission of the authentication area.

The acquisition of each authentication image iA is performed at a given acquisition magnification or enlargement rate and adapted to the nature of the microstructure of the paper in the present case. According to this exemplary embodiment of the method according to the invention, the acquisition magnification rate is chosen at an initial value that coincides with a visual observation without intermediate optical system. Within the framework of the invention, the magnification rate corresponds to the ratio of one of the linear dimensions of the final image given by the optical system to the corresponding dimension of the object. Likewise, within the framework of the invention, the magnification rate corresponds to the ratio between the diameter or apparent angle of the object observed and the diameter or apparent angle of the image given by the observation, acquisition instrument.

Figures 3, 4:
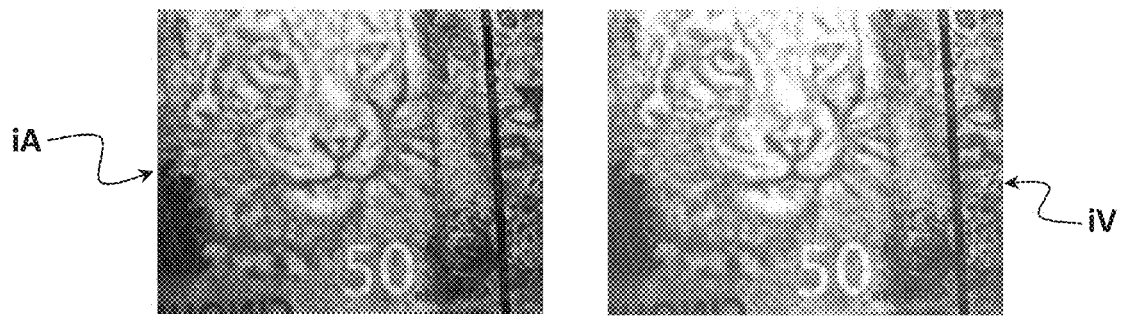
FIG. 3 is an authentication image of the authentication area of the authentic subject of FIG. 1.
FIG. 4 is a verification image of the authentication area of a candidate subject similar to the authentic subject of FIG. 1.

Each authentication image iA, as illustrated in FIG. 3, is, after its acquisition, recorded E2, as the case may be in compress form, into a database Bd, by being indexed based on an identifier of the corresponding banknote, for example the serial number thereof.

In a verification phase V, when an operator wants to verify the authenticity of a banknote belonging to the series of banknotes having undergone the recording phase, the operator carries out the acquisition V1 of a verification image iV of the authentication area. The verification image iV may for example comprise an image of the full watermark acquired at a magnification rate by means of an electronic device D, such as for example a smartphone, comprising a camera and a visualization screen, of the touch-type or not. Preferably, the electronic device comprises image acquisition means, computing and image processing means, means for communicating with an extended communication network, image visualization means, input means, and is adapted to implement certain steps at least of the method according to the invention. Among the electronic devices liable to be implemented, it may be mentioned, in particular, in addition to the smartphones, the tablets, the computers associated with acquisition and visualization systems such as a screen, a pair of glasses with an integrated projection system, a videoprojector, without this list is limitative nor exhaustive.

The verification image, as illustrated in FIG. 4, is for example made by placing the candidate subject S on a window pane 1 so as to be lighted from the rear during the acquisition, as shown in FIG. 5. Preferably, the conditions of acquisition of the authentication and verification images are close without being necessarily identical. It is to be noted that, in the present case, the operator has in his/her possession the candidate subject S at the time of the acquisition of the verification image, which contributes to reinforce the confidence of the operator into the checking operation he/she carries out.

Figure 6:
FIG. 6 is an image of the superimposition of the images of FIGS. 3 and 4 that allow visualizing a Glass pattern.

Thereafter, a suitable application, previously installed by the operator on the electronic device D, is implemented. This application queries, based on the serial number of the candidate subject, previously input by the operator, a remote database, so that the database sends to the application the authentication image iA corresponding to the serial number. The application then provides, at step V2, the superimposition of the verification image and the authentication image, which allows visualizing the image represented in FIG. 6. If the verification and authentication images are not substantially registered or in coincidence, the operator carries out the relative displacement of the verification and authentication images to tend to register them, with the help of the watermark pattern, using the keys of the smartphone or by moving his/her finger on the screen if the latter if a touchscreen. This action of the operator then makes it possible to offset one of the two images with respect to the other if they were initially in coincidence and to highlight progressively their similarities through the formation of a Glass pattern in the vicinity of their registration/coincidence. However, if during this relative displacement of the authentication image with respect to the verification image, step V3, the operator observes a Glass pattern, as can be seen in FIG. 6, then he/she may conclude that the candidate subject is the authentic subject, herein the banknote in his/her possession.

If the operator observes no Glass pattern during this registration operation and until the moment when he/she has placed the authentication and verification images in coincidence, he/she may from then one control, step V4, a slight relative displacement of the two images for example a slight rotation, typically of 2° or 5. This slight displacement may then result from a command similar to that used for the registration operation. The slight displacement may also result from a function of the application that automatically operates the relative displacement of the two images, whose parameters have been pre-recorded. If, after this slight displacement, the observer observes, step V5, a Glass pattern, then he/she can conclude that the candidate subject is the authentic subject. On the other hand, if the observer observes no Glass pattern, then he/she cannot conclude in the identity between the candidate subject and the authentic subject, he/she cannot clear out the doubt.

The fact that the registration or the displacement of one of the two images is initiated and decided by the operator allows confirming to the operator that he/she is well the master of the operation and hence to reinforce his/her confidence in the checking operation performed. Indeed, the last steps of the visual authentication are performed by the operator, so that he/she has no fear about being provided with erroneous information, because it is the operator that, within the framework of the visual authentication, decides whether there is authentication or not.

The authentication method according to the invention hence allows performing in a simple manner a verification of the authenticity of a candidate subject or to be authenticated by an operator, the final decision about the authenticity of the candidate subject remaining the responsibility of the operator. Moreover, this intervention of the operator may reinforce checking operations performed in an automated manner.

Moreover, it is to be noticed that the Glass pattern appears, as can be seen in FIG. 6, in the light and dark areas of the watermark, with a continuity or a trace, resulting from the displacement or the transformation applied, that extends in the light and dark areas. Hence, the inventors have highlighted that the apparition of the Glass pattern does not require a uniformly light or dark background and dot clouds as implemented by Léon Glass in his above-mentioned publications.

Moreover, it is to be noticed that the other security elements integrated into the banknote remain accessible and visible to the operator, who may use them to reinforce the authentication he/she has made.

The method according to the invention is particularly robust insofar as the authentication iA and/or verification iV images or the authentic subject S may undergo modifications over time without this obstruct the implementation of the method, under the condition that the modifications remain minor in the sense that the authentication and verification images are essentially geometry transforms of each other according, for example, to a relative geometric transformation G having at least one fixed or quasi-fixed point or also that these images result from an essentially projective transformation of the subject according to points of view and neighbour exposures during their acquisition in similar conditions.

Among the transformations or modifications that do not obstruct the implementation of the invention, it may be mentioned:
- a small displacement (rotation-translation) or a small geometric transformation, whose parameters evolve over time according to a movement that is not predefined and not known a priori, imparted by the observer to further reinforce the confidence associated with his/her observation (and to rule out the hypothesis of being in the presence of a "Yes machine"), minor processing for improving the images (signal level transformations, scalar or vectorial quantifications, contrast enhancement, interpolations, . . . ), minor optical distortions (view through optically transparent components),
- minor distortions of the image resulting from dynamic or static variations of the shooting angle between the authentication image and the verification image resulting for example from a low inclination of the device as indicated by the arrows F1 to F3 of FIG. 5,
- effects of the acquisition noise (implicit in any acquisition/re-acquisition),
- minor damage undergone by the authentication area due to the use (ageing, wear, local damage . . . ),
- minor surface processing of the varnishing, film coating type, without this list is limitative nor exhaustive.

The Glass patterns visualized within the framework of the invention are all the more observable and present since the physical correlation between the authentication and verification images or between the authentication image and the candidate or to-be-authenticated subject is high and varies from at least one fixed or quasi-fixed point. This variation is all the more significant since the details of the intermediate frequency domain are preserved and that their contrast is high. Optical and/or digital image improvement pre-processing operations may be applied thereto for a better observation. Hence, an optical zoom (variable-focus devices) and/or digital zoom allowing a better selection of the observation scale, a deconvolution of the image in order to eliminate a defocusing or a motion, a bandpass filtering for selecting/favouring the intermediate frequency details or a contrast enhancement for accentuating the contrast may, by way of example, be applied. Hence, in order to facilitate the visualization of the potential Glass pattern, the authentication and verification images as well as the image of the superimposition may, previously to their display, or even to their recording, undergo one or several improvement processing operations such as, for example, a contrast enhancement, in particular by grey level or decomposition colour channel histogram equalization or by inversion of the grey level or decomposition colour scales so as to form a negative image of the other (the positive one) with a view to observe an anti-correlation.

Moreover, the electronic device D may be adapted to allow the superimposition in real time of the authentication image with a verification video stream, i.e. a sequence of verification images, of the authentication area. Hence, the relative movements of the electronic device with the candidate subject induces a variation of the shooting angle or more generally of the point of view of the verification images with respect to the shooting angle, respectively to the point of view of the authentication image. This variation includes the apparition of Glass patterns in case of superimposition of images of the authentication area. In this respect, it is to be noticed that the Glass patterns liable to appear have not necessarily a single-centre spiral or circular conformation as can be seen in FIG. 6. Hence, FIG. 7 shows other forms of Glass patterns, it being understood that it is not an exhaustive or limitative presentation of the Glass pattern forms liable to appear within the framework of the invention.

According to another variant of implementation of the invention, for example to authenticate a sheet of paper as shown in FIG. 8 forming the authentic subject, the authentication image is recorded on a photographic film of the reversal type to form a slide, illustrated in FIG. 9, at a magnification rate substantially equal to 1 of an authentication area R of the subject that may be indicated or marked on a sheet to be authenticated.

During the verification phase, the operation superimposes the slide to the authentication area of the sheet and observes the result of this superimposition in show-through mode by lighting the whole from the rear as shown in FIG. 10. If the operator observes a Glass pattern, then he/she can conclude in the authenticity. On the other hand, if the observer observes no Glass pattern, he/she carries out a slight relative displacement of the slide and of the sheet of paper, to perform the registration thereof. If, during the registration, the observer perceives a Glass pattern, he/she concludes in the authenticity of the sheet, otherwise the observer cannot validate the authenticity of the subject. It is to be noticed that, unless a perfect superimposition, rather difficult to obtain manually, it appears at least a beginning of Glass pattern upon superimposition, wherein this pattern can be accented by the displacement.

Figure 12:
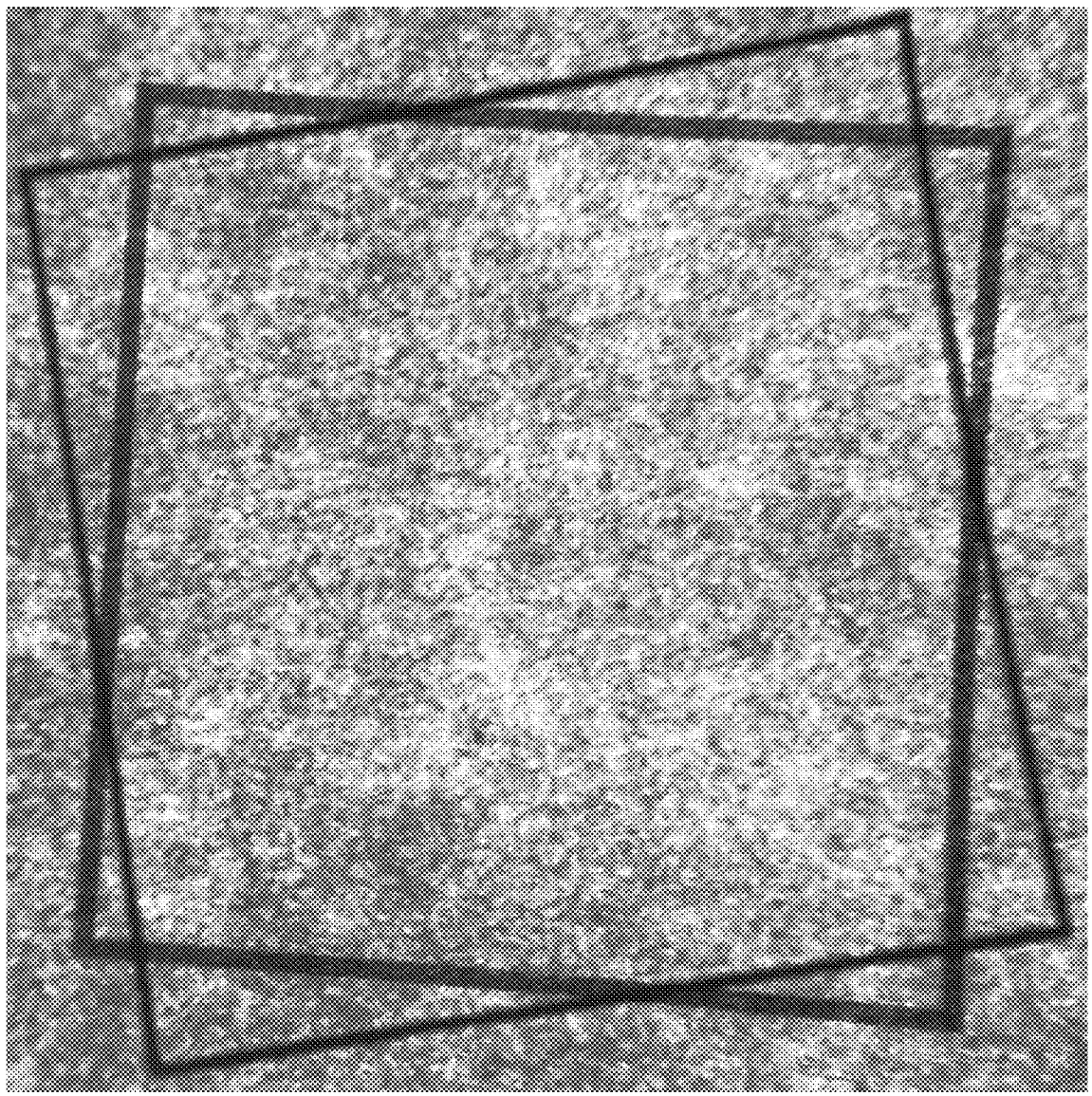
FIG. 12 is an image of the superimposition of the images of FIGS. 8 and 9 that does not allow visualizing a Glass pattern.

In case of superimposition of the authentication image of a sheet of paper as illustrated in FIG. 11 that does not correspond to the authentication image of FIG. 6, no Glass pattern is visible, as can be seen in FIG. 12.

It is to be emphasized that the implementation of the method according to the invention with an authentication image consisted of a slide superimposed to a sheet of paper demonstrates irrefutably that the Glass patterns can be perceived by the superimposition of two natural textures coming from an acquisition of a same authentication area of a same material subject. It may further be noticed that the textures of the superimposed images result from structures observed with the naked eye or with a magnification rate generally lower than ×10, preferably between ×2 and ×5. It is hence not necessary to use images of submicronic structures to make appear patterns of the Glass type.

In the exemplary embodiments described hereinabove in relation with FIGS. 1 to 12, the acquisition of the authentication and verification images is performed in transmission of the light through the subject. However, the method according to the invention may be implemented with authentication and verification images whose acquisition is performed in reflexion mode.

Figure 13:
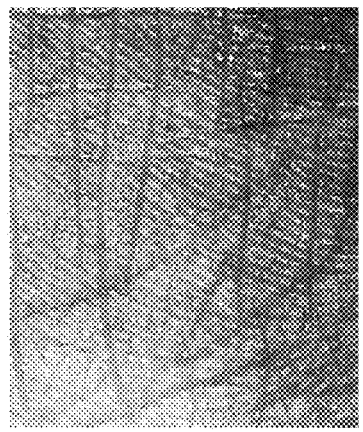
FIG. 13 is an authentication image of an authentic subject to be authenticated by means of the method according to the invention, formed by a hand palm.
Figure 14:
FIG. 14 is a verification image of a candidate subject similar to that of FIG. 13.
Figure 15:
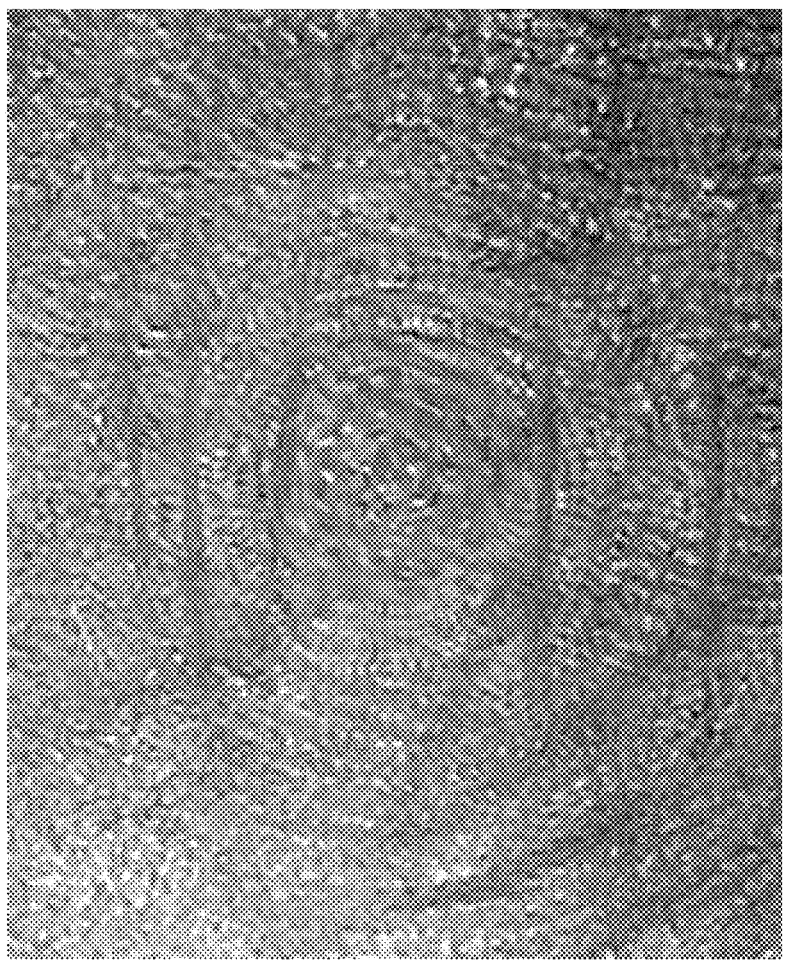
FIG. 15 is an image of the superimposition of the images of FIGS. 13 and 14 that allows visualizing a Glass pattern hence showing that the candidate subject is the authentic subject.

Hence, the method according to the invention may be implemented for the authentication of a hand palm of which an authentication image as illustrated in FIG. 13 will has previously been recorded. Subsequently to this recording, a verification of the authenticity or an identification is made, a verification image as illustrated in FIG. 14 is acquired. Then, the two images are superimposed as illustrated in FIG. 15. Insofar as a Glass pattern can be observed in FIG. 15, it is possible to conclude that the palm of the authentication image of FIG. 13 corresponds to the palm of the verification image of FIG. 14.

The invention is liable to find applications in different fields as, for example, in a process of traceability of a supply chain within which the different actors: producer, distributor, retailer, consumer, are all interested by the authenticity checking, with different financial and technical means at their disposal to perform this checking. Hence, the invention proves to be particularly advantageous in that it offers, from the producer to the downstream part of the distribution and consumption chain, the possibility to carry out the checking with simple tools and without risk of divulgation of implementation secrete as it may exist in case of use of a digital signature extracted from the matter with complex algorithms whose secrete must be preserved. Moreover, a producer holding the intellectual property rights may also be interested in knowing if a controlled product is at the good place in the supply chain (control of the parallel markets), whereas a consumer is first worrying to know if the product in question is effectively authentic or is interested in the services to which he/she can accede via an authentic product. The whole may be implemented as indicated hereinabove with the conjoint help of a unitary automatic authentication means (signature and identifier) and a visual object authentication means of the present invention. A control of access may hence be implemented with or without the extraction of a signature.

The invention may be implemented within the framework of various application of authentication, identification, serialisation, integrity checking and visual cryptography. In this respect, it is to be considered that, within the framework of the invention, the terms "authentication", "identification" and "integrity checking", may be equivalent according to the application contemplated.

Figure 16:
FIG. 16 is an authentication image of an authentic subject formed by a natural scene.
Figure 17:
FIG. 17 is a verification image of the authentic subject of FIG. 16, with a shooting angle slightly different from that of FIG. 16.
Figure 18:
FIG. 18 is an image of the superimposition of the images of FIGS. 16 and 17 that allows visualizing a Glass pattern.

The invention may be implemented to identify a natural scene or a landscape as shown in FIGS. 16 to 18. FIG. 16 is an image of a plain with, in the foreground, a meadow and, in the background, a mountain. FIG. 17 is an image of the same scene with an slightly different shooting angle.

FIG. 18 is the result of the superimposition of the two images with a slight relative rotation that allows making appear a Glass pattern in the left bottom of the image. The apparition of this pattern makes is possible to demonstrate the robustness of the method according to the invention to the differences of conditions of acquisition. Moreover, the apparition of the Glass pattern makes it possible to conclude that the two images correspond to the same natural scene. Hence, it is possible to identify the scene of the image of FIG. 17 from the image of FIG. 16. This would also have been possible if, for example, the image of FIG. 16 had comprised only a part of the meadow without the characteristic mountain background. The superimposition of the two images would have made it possible to deduce that image 17 corresponds to a part of the meadow of image 16. A same principle may be used to control the integrity of images or sequences of images of a film or a video. Moreover, by implementation of a meadow image, the inventors demonstrate again that it is not necessary to implement structures of microscopic size or of very small size to make appear Glass patterns from the matter.

Figure 19:
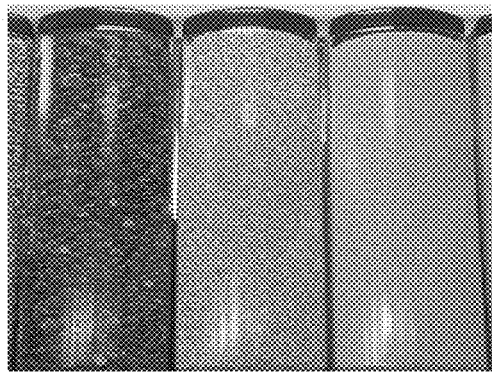
FIG. 19 is an authentication image of an authentic subject, formed by granular products stored in a transparent container.
Figure 20:
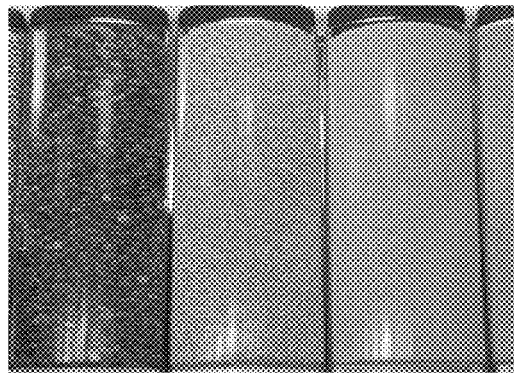
FIG. 20 is a verification image of the authentic subject of FIG. 19.
Figure 21:
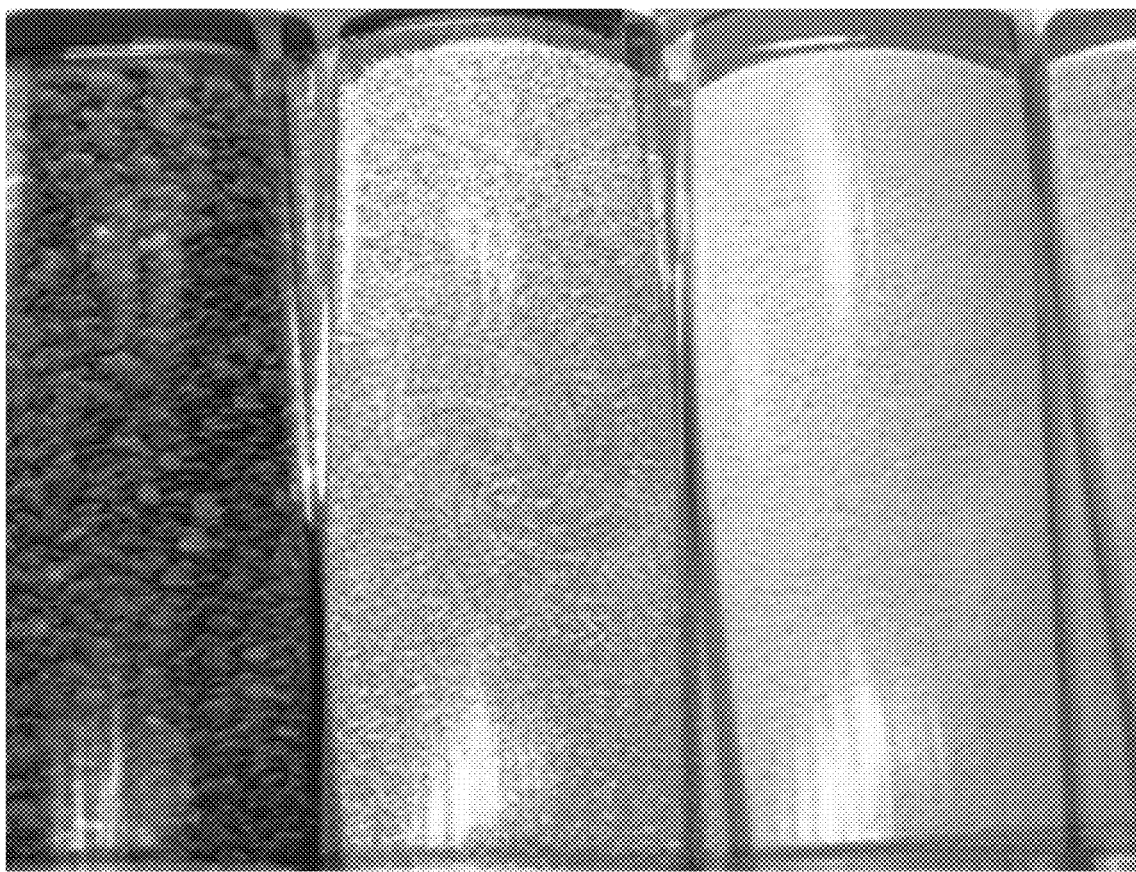
FIG. 21 is an image of the superimposition of the images of FIGS. 19 and 20 that allow visualizing a Glass pattern.

FIGS. 19 to 21 illustrate an implementation of the invention for checking the integrity of granulate products stored in transparent containers. The image of FIG. 19 has been taken at an instant $T_0$, whereas the image of FIG. 20 has been taken at an instant $T_1$, with a shooting angle slightly different from that of FIG. 19. The superimposition of the images 19 and 20 with a slight relative rotation makes appear a Glass pattern, as can be seen in FIG. 21. The apparition of this Glass pattern makes it possible to conclude that they are well same containers. Moreover, the apparition of the Glass pattern makes it possible to conclude that the content of the containers on which the Glass pattern is visible has not been displaced or mechanically affected, which also makes it possible to conclude in the integrity of this content.

Figure 22:
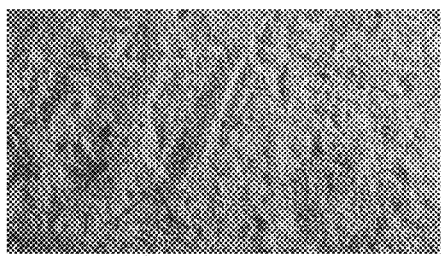
FIG. 22 is an authentication image of an authentic subject formed by a stretch of sand.
Figure 23:
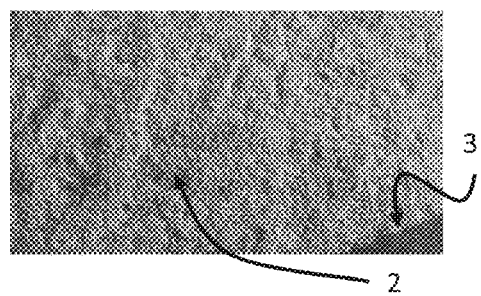
FIG. 23 is a verification image of the authentic subject of FIG. 22 that differs from FIG. 22 in that a part of the stretch of sand has been stirred and a shadow is present therein.
Figure 24:
FIG. 24 is an image of the superimposition of the images of FIGS. 22 and 23 that allows visualizing a Glass pattern.

FIGS. 22 to 24 illustrate an implementation of the invention for an authentication or an identification of a surface of sand visualized at two different time instants and having been partly modified. Hence, FIG. 22 is an image of the surface of sand in an initial state, whereas FIG. 23 is an image of the same surface acquired after alteration of this surface by a mark 2 made with a stick. The image of FIG. 23 is different from that of FIG. 22 by the presence of a shade 3 and by a slight difference of shooting angle. The superimposition of this two images with a slight relative rotation makes appear a Glass pattern M as can be seen in FIG. 24. The visualization of this Glass pattern makes it possible to conclude that it is well the same surface of sand and hence the same place. Moreover, the observation of the Glass pattern demonstrates that the method according to the invention is resistant to partial alterations of the authentic subject and robust as regards the variations of conditions of acquisition of the authentication and verification images.

It may further be noticed that Glass patterns are not observable in the area of the image corresponding to the altered part of the surface or of the authentication area. Hence, the invention may be implemented to check the integrity of the authentication area insofar as, where the Glass pattern is visible, it is possible to conclude that the authentication area has integrity or has not been altered from the acquisition of the authentication image.

Hence, the method according to the invention makes it possible to control the integrity of the surface of a subject. For that purpose, a series of authentication images is taken so as to cover the surface whose integrity is to be verified. The series of authentication images is recorded within the framework of the recording phase. During the authentication phase, corresponding in the present case to an integrity checking, a series of verification images of the surface whose integrity is to be verified is taken so as to cover the latter. Then, each authentication image of an area of the surface is superimposed to a verification image of the same area of the surface for, in case of visualization of a Glass pattern, concluding in the integrity of the corresponding area, the doubt about the integrity subsisting in the areas in which the pattern does not appear.

According to another variant of the invention, the method of visual authentication implements visual cryptography. It is to be noted that this variant may, according to its implementation, be likened to a method of pure visual cryptography. Typically, it may be chosen to locally apply a rotation within a thick-edge grid on the authentication image by way of residual geometry transformation, accompanied with a grey level inversion in order to improve the contrast of the message during the superimposition.

Figure 25:
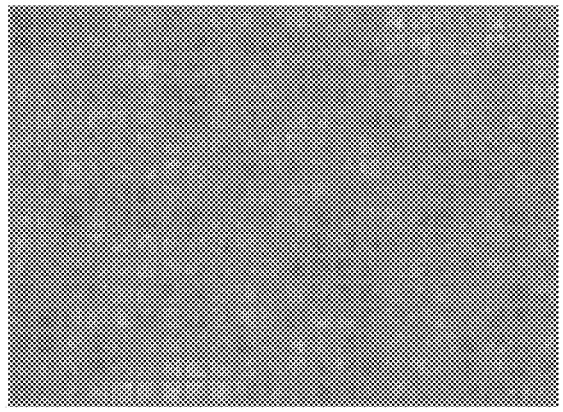
FIGS. 25 to 28 are images illustrating the implementation of visual cryptography with the method of visual authentication according to the invention.
Figure 26:
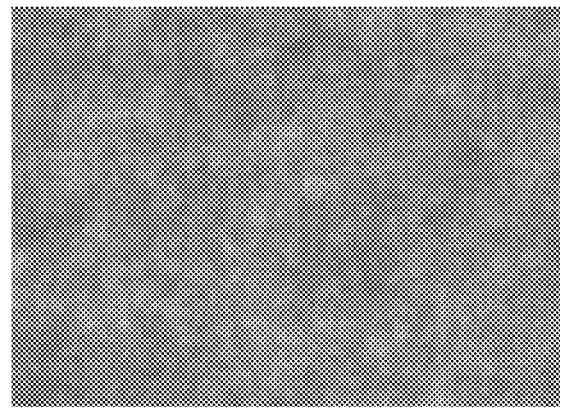

In this context, it is an authentication image of a sheet of paper that is recorded after having been masked according to a matrix or a grid of cells whose internal surface is formed by the corresponding part of the authentication image and that are separated by an independent thick edge intended to break the continuity of the image to avoid any detection of the geometric transformation applied within each cells, whose choice depends on a random bit and, as the case may be, on the corresponding bit of the message-image, herein supposed to be binary, to be transmitted, as can be seen in FIG. 25. In the present case, the transformed cells undergo a rotation of a few degrees about their centre or isobarycentre. The authentication image as illustrated in FIG. 25 is then recorded. It may be noticed that no message is visible in FIG. 25. When it is desired to read the message hidden in FIG. 25, a verification image, as illustrated in FIG. 26, which corresponds to an image of the same authentication area than that used for making the authentication image, is used.

Figure 27:
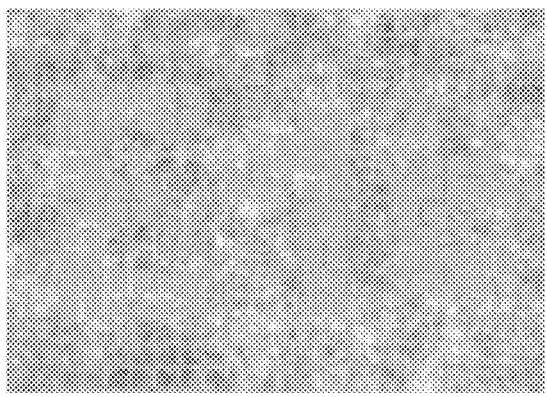
Figure 28:
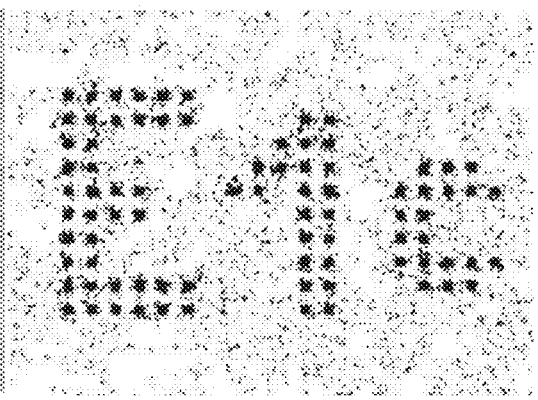

The verification image (FIG. 26) is then superimposed to the authentication image (FIG. 28) and the image of FIG. 27 is hence obtained, in which the message E1c can be read. In order to facilitate the reading, the image of the superimposition may undergo an improvement processing such as an histogram transformation, which allows obtaining the image illustrated in FIG. 28, on which the message is more contrasted.

Of course, various other variants of the method according to the invention may be contemplated within the framework of the appended claims.

The invention claimed is:

1. A method for visual authentication and/or visual checking of integrity of a subject, the method comprising steps of:

forming a superimposition image by visually superimposing, optically or electronically and without adding, extracting or generating discrete elements or discrete patterns:

on the one hand, at least one image, called authentication image, of at least one authentication area of an authentic subject, the authentication image comprising a continuous random component texture, and on the other hand, the authentication area itself of a candidate subject or a verification image of the authentication area of the candidate subject, the authentication area itself of the candidate subject or the verification image of the authentication area of the candidate subject including the continuous random component texture; and in case of observation, on the superimposition image resulting from the superimposition, of an optical phenomenon of the Glass pattern type at the authentication area, concluding that the candidate subject is the authentic subject and/or in the at least partial integrity of the authentication area of the authentic subject.

2. The method according to claim 1, comprising the following steps:

selecting an authentic subject among three-dimensional or material subjects each having at least one authentication area having, in given conditions of observation, an intrinsic material structure that is not easily reproducible and observable by an observer having a mean visual acuity;

in a recording phase:

i) acquiring at least one authentication optical image of the authentic subject comprising at least the authentication area, the acquisition being performed at a given acquisition magnification or enlargement rate and/or in given conditions so that, for an observer having a mean visual acuity, the image of the authentication area having at least one continuous random component texture intrinsic to the authentic subject, and ii) recording the at least one authentication optical image; and in a verification phase, at least partially superimposing each authentication optical image and a candidate subject, for:

i) in a case of observation of the apparition of an optical phenomenon of the Glass pattern type, concluding that the candidate substrate is the authentic subject, and ii) in a case of non-observation of a Glass pattern, making an at least local geometric transformation of the authentication optical image and/or a relative displacement of the authentication optical image with respect to the candidate subject for, in case of observation of the apparition of an optical phenomenon of the Glass pattern type, concluding that the candidate subject is the authentic subject.

3. The method according to claim 2, wherein the authentication image is projected to the candidate subject.

4. The method according to claim 1, wherein the acquisition of the authentication image is performed at an acquisition magnification or enlargement rate allowing the superimposition of the authentication image and the candidate subject.

5. The method according to claim 1, wherein the authentication area is at least translucent and in that the verification phase is performed in show-through mode.

6. The method according to claim 1, wherein the verification phase is performed by means of an electronic device comprising at least display means adapted to display or project the authentication image and to allow the superimposition of the candidate subject and the authentication image substantially at the scale of the candidate subject.

7. The method according to claim 1, comprising the following steps:
  selecting an authentic subject among three-dimensional or material subjects each having at least one authentication area having, in given conditions of observation, an intrinsic material micro-structure that is not easily reproducible and observable by an observer having a mean visual acuity,
  in a recording phase:
  acquiring at least one authentication image of the authentic subject comprising at least the authentication area, the acquisition being made at such an acquisition magnification or enlargement rate that, for an observer having a mean visual acuity, the image of the authentication area has a continuous random component texture,
  recording the authentication image,
  in a visual verification phase:
  acquiring at least one verification image of a candidate subject comprising at least one part of the authentication area, the acquisition being performed at a magnification or enlargement rate allowing a visualization of the authentication and verification images at a same scale,
  at least partially superimposing the authentication and verification images substantially at a same scale, for:
    in case of observation by the operator of the apparition of an optical phenomenon of the Glass pattern type, concluding that the candidate substrate is the authentic subject, and
    in case of non-observation of a Glass pattern, making an at least local geometric transformation of at least one image of the superimposed images and/or a relative displacement of the superimposed images, and
    in case of observation of the apparition of an optical phenomenon of the Glass pattern type, concluding that the candidate subject is the authentic subject.

8. The method according to claim 7, wherein the verification phase is performed by means of an electronic device comprising at least:
  acquisition means adapted to acquire at least one verification image,
  display means adapted to display the verification image on a visualization screen and to allow the superimposition of the verification and authentication images substantially at a same scale.

9. The method according to claim 8, wherein the electronic device is adapted to provide a display of a sequence or a series of verification images resulting from a relative displacement of the acquisition means and of the candidate subject and to allow the superimposition of the verification images with the authentication image.

10. The method according to claim 8, wherein the electronic device comprises processing means adapted to perform an at least local geometric transformation of at least one image of the superimposed images and/or a relative displacement of the superimposed images.

11. The method according to claim 8, wherein at least one verification image is recorded in a digital form.

12. The method according to claim 8, wherein the verification image is visualized and/or recorded in grey level or halftone.

13. The method according to claim 8, wherein it further comprises an automatic verification phase that is performed at least in part by the electronic device and that comprises a step of computing a similarity coefficient between a verification image and the authentication image for, if the similarity coefficient is higher than a given threshold, concluding in a high probability of authenticity or even in an authenticity and, in the opposite case, not concluding in the authenticity.

14. The method according to claim 13, wherein the computing of the similarity coefficient is performed based on signatures extracted from a verification image and from the authentication image.

15. The method according to claim 13, wherein the automatic verification phase comprises a step of transmission or communication of the result of the automatic verification to a third party or to the user.

16. A method for visual authentication and/or visual checking of integrity, the method comprising:
  visually superimposing, optically or electronically:
  on the one hand, at least one image, called authentication image, of at least one authentication area of an authentic subject, the authentication image comprising at least one continuous random component texture, and
  on the other hand, the authentication area itself of a candidate subject or at least one verification image of the authentication area of the candidate subject,
  in case of observation, on the image resulting from the superimposition, of an optical phenomenon of the Glass pattern type at the authentication area, concluding that the candidate subject is the authentic subject and/or in the at least partial integrity of the authentication area of the authentic subject,
  wherein the authentication image is recorded by applying to this latter a matrix or a grid of cells whose internal surface is formed by the corresponding part of the authentication image and that are separated by a surface unrelated to the authentication image and in that, before the recording of the authentication image, certain at least of the cells undergo a geometric transformation of the image contained in the corresponding cell.

17. The method according to the claim 16, wherein the cells undergoing a transformation are chosen so as to form a message or pattern upon superimposition with a verification image.

18. The method according to claim 1, wherein the geometric transformation consists in at least one locally-applied geometric transformation chosen among the affine or rigid transformations or combinations of affine and/or rigid transformations.

19. The method according to claim 1, wherein the geometric transformation induces a reduced modification or of small or very small amplitude of the image part modified and lower than the length of correlation of the image of the authentication area before modification.

20. The method according to claim 1, wherein the relative displacement is a translation, a rotation or the combination of one or several rotations and/or translations.

* * * * *